United States Patent [19]
Rubin et al.

[11] 3,830,102
[45] Aug. 20, 1974

[54] HIGH VELOCITY WATER RING APPARATUS

[75] Inventors: Edwin H. Rubin, Hazlet, N.J.;
Joseph L. Ciringione, Bellmore, N.Y.

[73] Assignee: The United States of America as represented by the Secretary of the Navy, Washington, D.C.

[22] Filed: Mar. 13, 1973

[21] Appl. No.: 340,860

[52] U.S. Cl. .................................. 73/148, 73/86
[51] Int. Cl. .......................................... G01m 10/00
[58] Field of Search ................................ 73/148, 86

[56] References Cited
UNITED STATES PATENTS
2,382,999  8/1945  Lee .............................. 73/148

2,585,442  2/1952  Cotton .......................... 73/148

*Primary Examiner*—S. Clement Swisher
*Attorney, Agent, or Firm*—Richard S. Sciascia; Arthur A. McGill; Prithvi C. Lall

[57]       ABSTRACT

A mechanical simulator for testing materials to be evaluated for a high speed captured air bubble (CAB) vehicle. A rotating drum carrying water allows the water to move at high speeds past a stationary specimen immersed in the water to a predetermined variable depth.

5 Claims, 3 Drawing Figures

PATENTED AUG 20 1974  3,830,102

HIGH VELOCITY WATER RING APPARATUS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a mechanical simulator and more particularly to a high speed water ring apparatus for testing of protective, structural, and seal materials for surface effect ships (SES) craft under conditions simulating anticipated service conditions.

Prior art methods used for testing material specimens to be used in SES craft make use of a large pool of water in which the specimen is rotated at different speeds in relatively still water. Such methods are expensive and time consuming. Furthermore, such methods do not simulate the anticipated service conditions in that the limited size pool of water through which the specimen is rotated cannot remain still while the specimen is rotating and therefore with high rotational velocities, the water will become unnaturally inclined to the horizontal plane of the rotating arm and the specimen due to centricugal forces. Besides, construction and operation of a big pool to conduct such specimen tests is time consuming and uneconomical. Thus, it is desirable to have an improved mechanical simulator which will simulate anticipated service conditions for conducting tests for material specimens to be used in a SES craft.

SUMMARY OF THE INVENTION

The objects and advantages of the present invention are accomplished by utilizing a mechanical simulator for testing material specimens used in a SES craft. The simulator is a high velocity water ring apparatus which comprises a large drum chamber supported on a stand or a support structure and driven by a motor. A stationary shaft supporting the drum on roller bearings has two passages in order to permit water circulation into and out of the drum chamber. Such circulation is desirable to permit dissipation of heat generated during the operation of the simulator. A specimen support arm is secured to the stationary shaft at one end and the test specimen is fastened to the specimen support arm through an elongated slot at the other end thereof. Large acrylic transparent windows on the end of the drum permit viewing of the specimen during operation and provide access into the drum chamber between tests. The drum chamber is rotated at different speeds by means of the motor, thereby rotating the water inside the drum chamber. The moving water is thus made to pass the material specimen at variable speeds and thereby simulate anticipated service conditions for the material specimen under test.

An object of this invention is to have a mechanical simulator for testing protective structural and seal material specimens for the SES craft. Another object of this invention is to have a mechanical simulator which provides the anticipated service conditions as closely as possible for testing the material specimens for the SES craft.

Still another object of this invention is to have a mechanical simulator for testing material specimens for the SES craft which is economical and less time consuming in use than prior test means.

Still another object of this invention is to have a mechanical simulator wherein the material specimen is stationary and water is moving past the specimen at various speeds.

Other objects, advantages and novel features of this invention will become apparent from the following detailed description of the invention when considered in conjunction with the accompanying drawings wherein:

DESCRIPTION OF A PREFERRED EMBODIMENT

Figure 3:
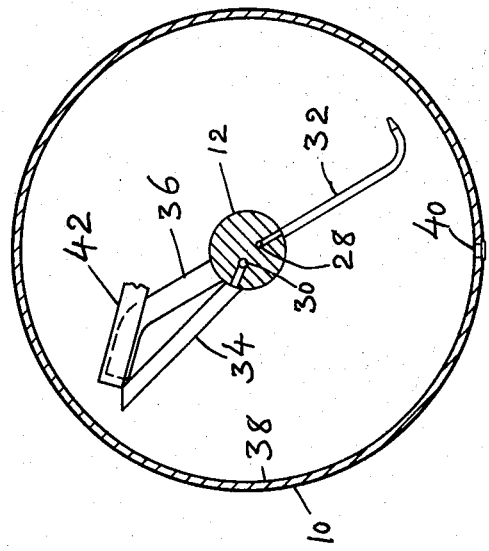
FIG. 3 is a cross section taken along line 3—3 of FIG. 2.
Figure 2:
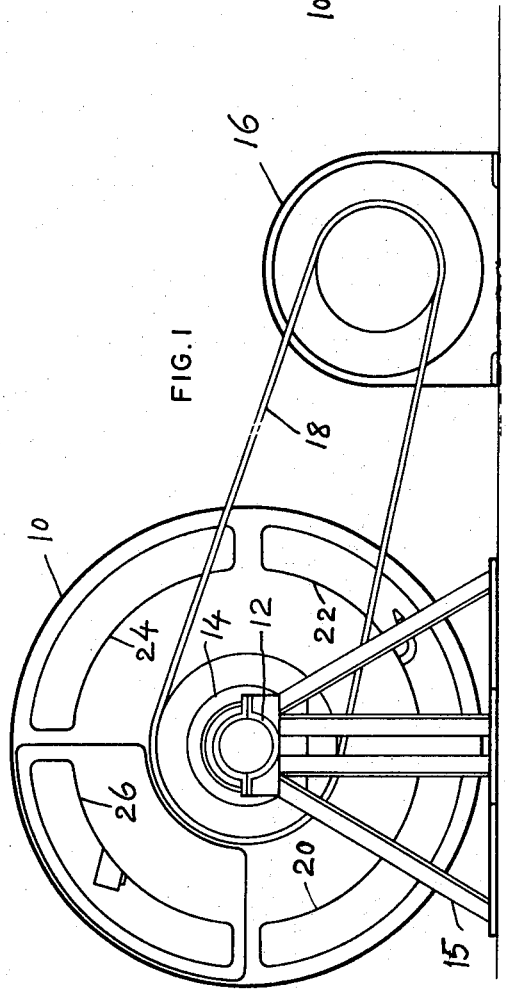
FIG. 2 is a top view thereof.
Figure 1:
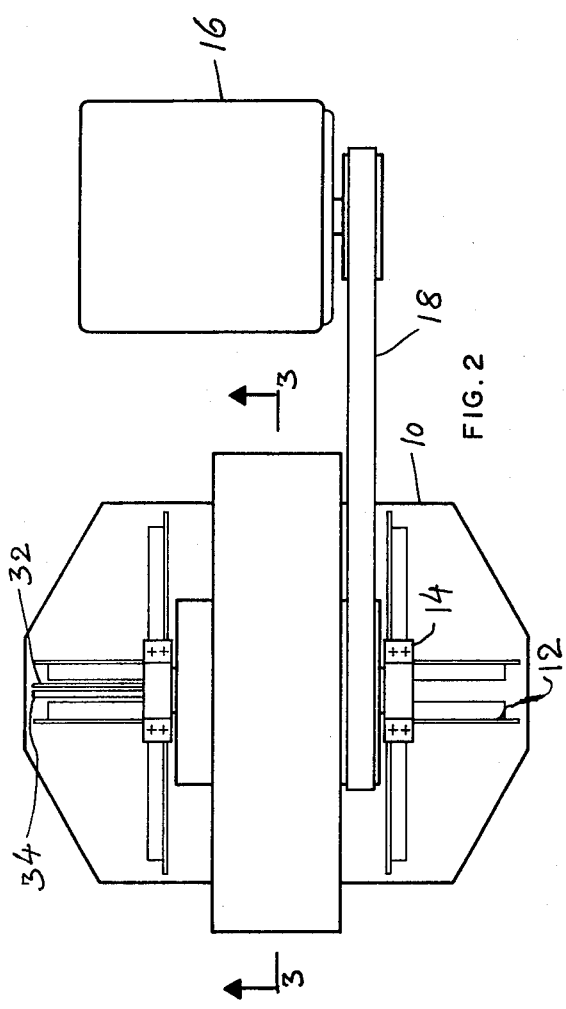
FIG. 1 is a side view of the high velocity water ring apparatus.

Referring to the drawings wherein like reference characters designate like parts throughout and more particularly to FIG. 1 thereof, a side view of the high velocity water ring apparatus is shown. A drum chamber 10, preferably made out of a metallic plate about ½ inch thick, which is strong enough to withstand high pressures generated during the testing of the material specimens, is supported by a stationary shaft 12 in roller bearings 14. The stationary shaft is mounted on a base or stand 15. Roller bearings 14 are coupled to a high power motor 16 by means of a belt 18. Acrylic windows 20, 22, 24 and 26 are provided on one side of the drum chamber in order to view the specimen under test and also to have access into the drum chamber between tests. Two passways 28 and 30 are drilled in the stationary shaft 12 in order to permit cooling water circulation into and out of the drum chamber 10 through the inlet pipe 32 and outlet pipe 34. A specimen support arm 36 is coupled to the stationary supporting shaft 12 at one end and a specimen under test is adjustably mountable at the other end of the specimen arm 36. It is preferable to mount the test specimen to the specimen support arm through an elongated slot and thus adjust the position of the test specimen relative to inner wall 38 of drum chamber 10. A half inch thick aluminum plate was preferably used to make the drum chamber. A drain plug 40 is also installed in the drum chamber 10 to drain the water from the drum chamber after completion of the tests. The cooling water inlet pipe 32 curves in the direction of water flow, as shown in FIGS. 1 and 3, in order to minimize turbulence and velocity losses. The outlet pipe 34 is positioned behind the specimen 42 and the specimen support arm 36 in order to minimize drag losses and turbulence. The angular cut end of the outlet pipe 34 as shown in FIG. 3 results in an oversize elliptical opening, providing additional outlet area for regulating the depth of water inside the drum chamber 10.

In operation, sea water is brought into the drum chamber up to a desired level. The specimen is then mounted on the specimen support arm and its position is adjusted so that it is in water up to a desired length. The high power motor is then turned on, and the motor rotates the drum chamber through a belt drive-roller bearing arrangement. As the drum chamber rotates, a stream of water moving at a high speed moves past the specimen and thereby subjects the specimen to anticipated service conditions. (For example, a water velocity of 90 knots can be attained with a speed of 660 revolution per minute of the drum.) The specimen can be viewed or photographed through the acrylic windows on the side of the drum chamber.

Thus a mechanical simulator for testing material specimens under anticipated service conditions, according to the teachings of this invention, comprises a drum chamber which is supported by a stationary shaft on roller bearings. Two passages are drilled in the stationary shaft to permit cooling water circulation into and out of the drum chamber through the inlet and outlet pipes. The drum chamber is rotated at different speeds by a high power motor, preferably of the order of 75 horsepower, which is coupled to the drum chamber through roller bearings. A specimen support arm is mounted on the stationary supporting shaft at one end and a specimen under test is adjustably and demountably mounted on the end of the specimen support arm. The positions of the inlet and outlet pipes to circulate cooling water inside the drum chamber are adjusted so as to minimize turbulence and drag losses.

Obviously many modifications and variations of the present invention are possible in the light of above teachings. As an example, an idler pulley may be used to control tension on the belt drive and thereby the problem of excessively high starting torque requirement is relieved. Furthermore, a plurality of fins on the outside of the drum chamber may be used to help dissipate heat generated in the drum chamber during the test operations. In addition, the stationary shaft to support the drum can be hollow for introducing water into the drum chamber after starting in order to avoid the high starting torque requirement of the unbalanced water load. It is therefore understood that within the scope of the appended claims the invention may be practiced otherwise than as specifically described.

We claim:

1. A mechanical simulator for testing specimens for a high speed captured air bubble vehicle comprising:
   a base;
   an elongated member mounted on said base;
   a drum chamber, said drum chamber having roller bearings journalled rotatably on said elongated member;
   a motor;
   a drive means coupling said drum chamber to said motor;
   a specimen support arm having one end attached to said elongated member inside of said drum chamber, said support arm being adapted to carry a specimen at other end;
   means for circulating fluids into and out of said drum chamber.

2. The simulator of claim 1 wherein said drum chamber further includes a plurality of windows on one end thereof.

3. The simulator of claim 1 wherein said specimen support arm includes an elongated slot for adjustably mounting said specimen at the second end of said specimen support arm.

4. The simulator of claim 1 wherein said elongated member includes a stationary shaft mounted on said base.

5. The simulator of claim 4 wherein said means for circulating fluids into and out of said drum chamber comprise a first passway in said stationary shaft for letting said circulating fluids into said drum chamber and a second passway for letting said circulating fluids out of said drum chamber.

* * * * *